(12) United States Patent
Kimura et al.

(10) Patent No.: US 7,707,904 B2
(45) Date of Patent: May 4, 2010

(54) SHIFT RANGE SWITCHING DEVICE AND METHOD FOR SWITCHING SHIFT RANGE

(75) Inventors: Kiyoshi Kimura, Obu (JP); Taku Itoh, Chita-gun (JP); Shigeru Yoshiyama, Kariya (JP)

(73) Assignee: Denso Corporation, Kariya (JP)

( * ) Notice: Subject to any disclaimer, the term of this patent is extended or adjusted under 35 U.S.C. 154(b) by 358 days.

(21) Appl. No.: 11/950,727

(22) Filed: Dec. 5, 2007

(65) Prior Publication Data

US 2008/0141807 A1  Jun. 19, 2008

(30) Foreign Application Priority Data

Dec. 15, 2006  (JP)  ............................. 2006-338340

(51) Int. Cl.
*F16H 59/00*  (2006.01)
(52) U.S. Cl. ........................................ 74/335
(58) Field of Classification Search ................ None
See application file for complete search history.

(56) References Cited

U.S. PATENT DOCUMENTS 6,003,395 A * 12/1999 Rogg et al. ................... 74/335
6,062,097 A *  5/2000 Imao et al. ............... 74/473.12
6,155,129 A * 12/2000 Dorfschmid et al. ..... 74/473.12
6,857,981 B2    2/2005 Hori et al.

* cited by examiner

*Primary Examiner*—Dirk Wright
(74) *Attorney, Agent, or Firm*—Nixon & Vanderhye, PC (57) ABSTRACT

A shift range switching device is provided to a shift-by-wire system for an automatic transmission device. The shift range switching device includes a range switching unit for switching a shift range of the automatic transmission device between a P range and the other range. The shift range switching device further includes an actuator including an electric motor and a reduction device. The reduction device transmits driving force of the electric motor to the range switching unit for actuating the range switching unit as instructed. The reduction device has a variable reduction ratio. The reduction device transmits the driving force in switching of the shift range from the P range to the other range at a reduction ratio, which is greater than a reduction ratio in switching of the shift range from the other range to the P range.

9 Claims, 4 Drawing Sheets

SHIFT RANGE SWITCHING DEVICE AND METHOD FOR SWITCHING SHIFT RANGE

CROSS REFERENCE TO RELATED APPLICATIONS

This application is based on and incorporates herein by reference Japanese Patent Application No. 2006-338340 filed on Dec. 15, 2006.

FIELD OF THE INVENTION

The present invention relates to a shift range switching device for a shift-by-wire system for an automatic transmission. The present invention further relates to a method for switching a shift range of the automatic transmission via the shift-by-wire system.

BACKGROUND OF THE INVENTION

In recent years, a shift-by-wire system is generally used in a vehicle. For example, as disclosed in U.S. Pat. No. 6,857,981 (JP-A-2004-52928), a shift-by-wire system includes an electric motor for actuating a range switching unit to switch a shift range of an automatic transmission device, in accordance with an instructed shift range selected by a vehicular occupant.

In switching of the shift range of the automatic transmission device, a torque required for actuating the range switching unit differs depending upon the shift range to be switched. Specifically, the required torque becomes the maximum when the shift range is switched from a P range to another range, such as an R range. In particular, when the shift range is switched from the P range to the other range in a condition where the vehicle is parked on a sloping road, a torque required for bringing a parking lock mechanism into the unlocked state thereof becomes large. In this state, the required torque becomes still further greater.

Therefore, the shift range switching device disclosed in U.S. Pat. No. 6,857,981 includes a reduction device for transmitting the power of the electric motor to the range switching unit. The reduction device is selected to be in one gear ratio for producing the torque required in the switching from the P range to the other range.

The parking lock mechanism is provided for bringing the output shaft of the automatic transmission device into the locked state thereof in conjunction with the switching actuation of the range switching unit to the P range. Alternatively, parking lock mechanism brings the output shaft of the automatic transmission device into the unlocked state thereof in conjunction with the switching actuation to the other range.

In U.S. Pat. No. 6,857,981, the P range can be reliably switched to the other range when the gear ratio of the reduction device is selected to produce the torque required in the switching from the P range to the other range. However, the range switching unit is actuated at a large gear ratio, even in any other switchings when such a large torque is not necessary. Consequently, actuations of the range switching unit in the other switchings becomes slow, and response of the range switching unit is impaired.

SUMMARY OF THE INVENTION

In view of the foregoing and other problems, it is an object of the present invention to produce a shift range switching device for a shift-by-wire system for an automatic transmission device, the shift range switching device being capable of reliable and quick switching of shift ranges. It is another object of the present invention to produce a method for switching a shift range of the automatic transmission device via the shift-by-wire system.

According to one aspect of the present invention, a shift range switching device for a shift-by-wire system for an automatic transmission device, the shift range switching device comprises a range switching unit for switching a shift range of the automatic transmission device between a P range and an other range. The shift range switching device further comprises an actuator including an electric motor and a reduction device, the reduction device transmitting driving force of the electric motor to the range switching unit for actuating the range switching unit as instructed. The reduction device has a variable reduction ratio. The reduction device transmits the driving force in switching of the shift range from the P range to the other range at a reduction ratio, which is greater than a reduction ratio in switching of the shift range from the other range to the P range.

According to another aspect of the present invention, a method for switching a shift range of an automatic transmission device via a shift-by-wire system, the method comprises transmitting driving force of an electric motor to a range switching unit via a reduction device at a first reduction ratio in switching of the shift range from a P range to an other range. The method further comprises transmitting the driving force of the electric motor to the range switching unit via the reduction device at a second reduction ratio in switching of the shift range from the other rang to the P range. The first reduction ratio is greater the second reduction ratio.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

First, a shift-by-wire system 10 is described with reference to FIG. 2.

The shift-by-wire system 10 is provided for controlling a vehicle such as a two-wheel drive vehicle and a four-wheel drive vehicle. The shift-by-wire system 10 includes an actuator 20, an ECU 80 for controlling the shift-by-wire system (SBW system) 10, a parking lock device 70, and an automatic transmission control device 12.

The ECU 80 for controlling the shift-by-wire system 10 is an electronic circuit constructed of a microcomputer having a CPU, a RAM, a ROM, an EEPROM, and the like. An occupant operates, for example, an unillustrated shift lever to set an instruction shift range. The ECU 80 detects the instruction shift range, thereby manipulating the actuator 20 corresponding to the instruction shift range, so that the ECU 80 controls a rotational position of a control rod 50.

Figure 2:
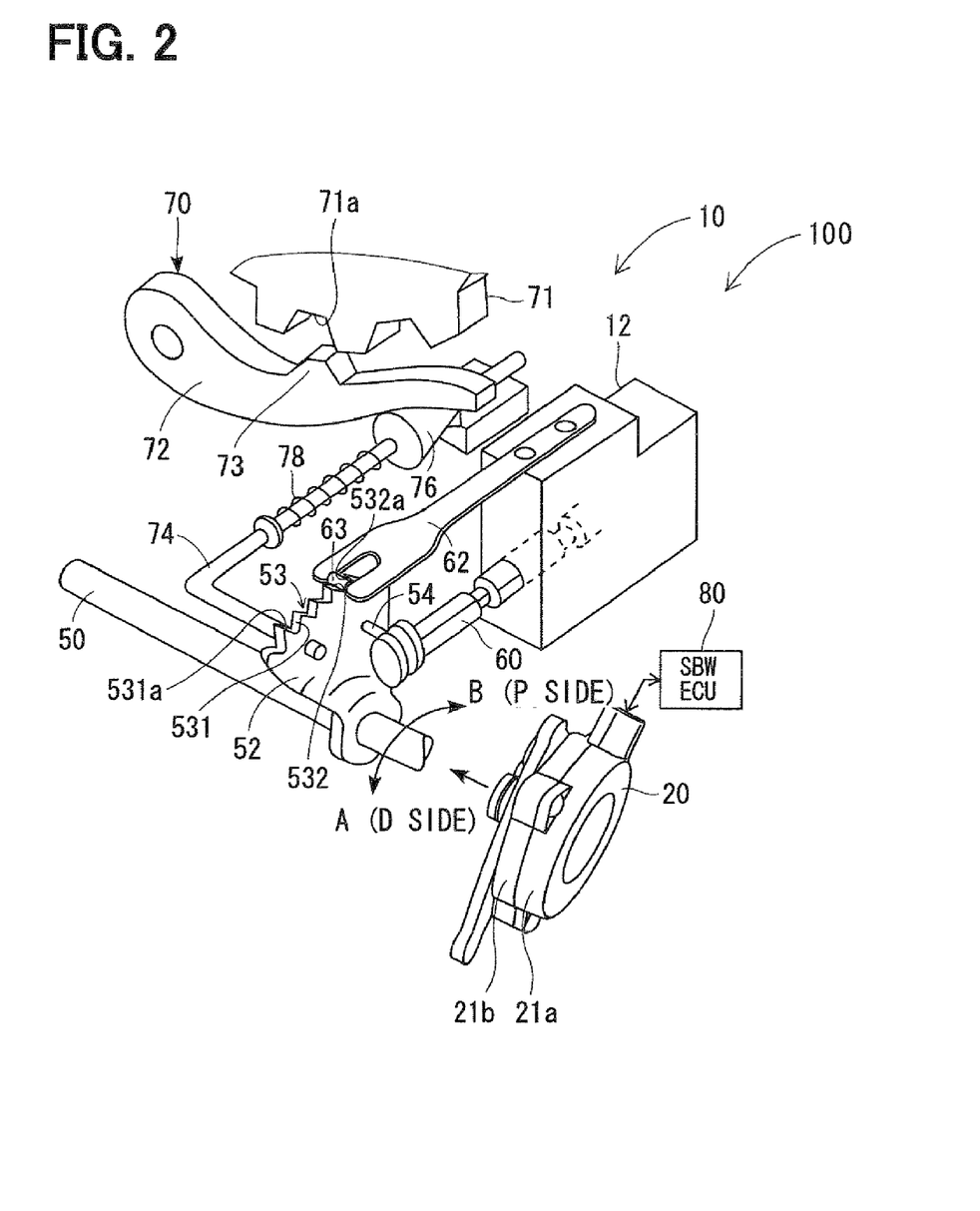
FIG. 2, is a perspective view showing the shift-by-wire system provided with the actuator.

The control rod 50 rotates corresponding to the instruction shift range, so that a manual valve 60 axially moves, thereby switching hydraulic passages in the automatic transmission control device 12 to change a shift range of an automatic transmission device 100 (FIG. 2). The occupant may change the shift range by operating, for example, a shift switch such as a button. Alternatively, the occupant may acoustically instruct a voice recognition device to change the shift range. The shift position of the shift lever is detected using a sensor or the like adapted to detecting positions of the shift lever. In this embodiment, the sensor is a non-contact type sensor. Alternatively, the sensor may have a contact device in which contact positions change in conjunction with the operation of the shift lever.

The automatic transmission device 100 is controlled at shift ranges including moving ranges, a non-moving range, and a neutral range. Each of moving ranges corresponds to a D range and an R range. The D range is a forward moving range. The R range is a backward moving range. The non-moving range corresponds to the P range, which is a parking range. The neutral range corresponds to the N range. The R, N, and D ranges correspond to the other range.

The automatic transmission control device 12 includes a hydraulic device for switching the shift range and the shift position of the automatic transmission device 100. The manual valve 60 moves to switch the hydraulic circuits of the automatic transmission control device 12, and selects a range position. Thus, the automatic transmission control device 12 sets the automatic transmission device 100 at one of the shift ranges.

The ECU 80 detects the instruction shift range of the shift lever, which is operated by the occupant, using the sensor or the like. The ECU 80 instructs an electric motor 30 (FIG. 3) of the actuator 20 to rotate by a rotation angle correspondingly to the detected instruction shift range. Thus, the ECU 80 controls the rotation angle of the electric motor 30 correspondingly to the instruction shift range.

Figure 3:
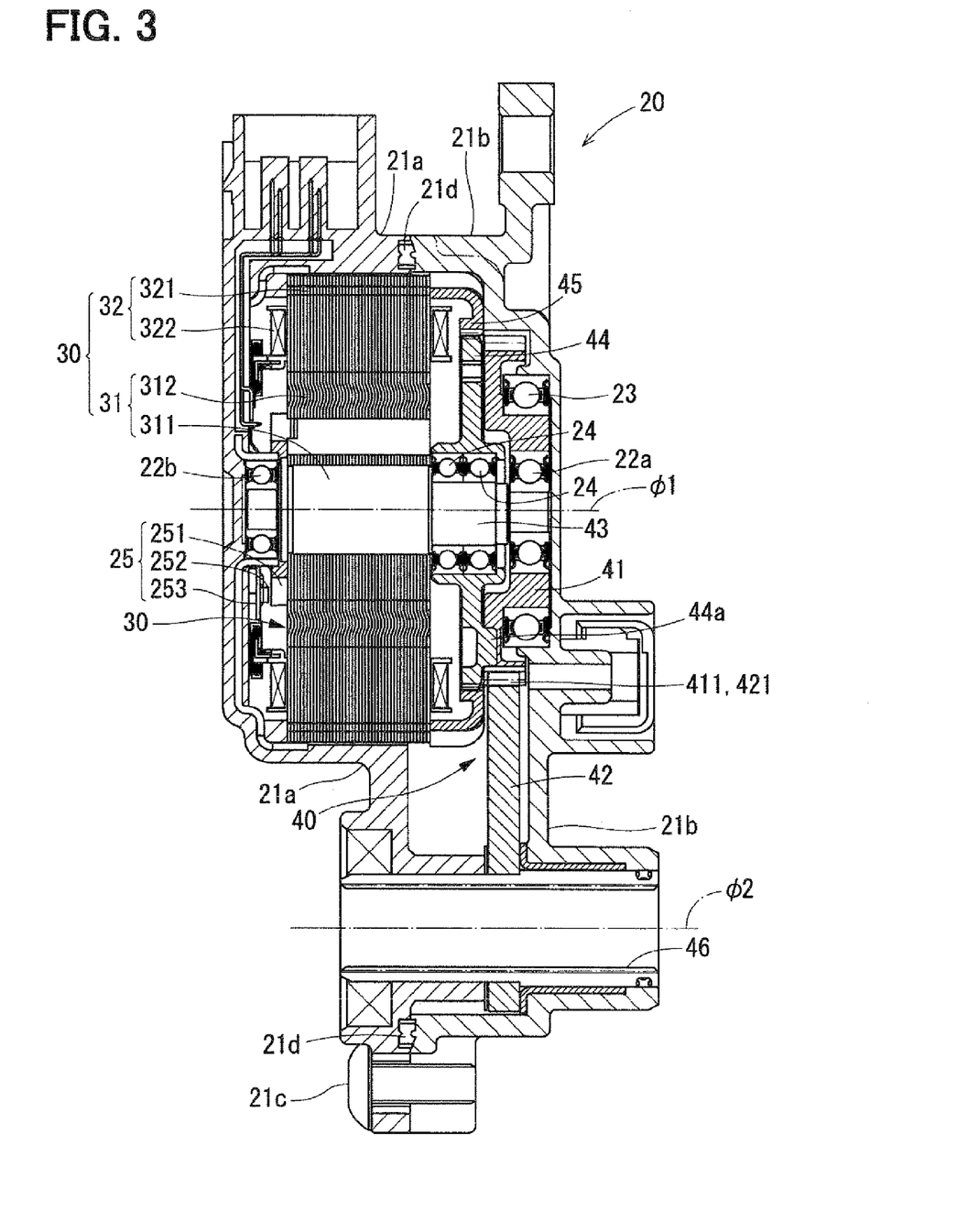
FIG. 3 is a sectional view taken along the line III-III in FIG. 1.

The control rod 50 is connected with an output shaft (motor output shaft) 46 (FIG. 3) of the electric motor 30. The electric motor 30 produces driving force, so that the driving force is transmitted to the control rod 50 via a reduction device 40 (FIG. 3). The control rod 50 is fixed to a detent plate 52 such that the control rod 50 is rotatable together with the detent plate 52. As shown in FIG. 2, the detent plate 52 rotates in rotative directions A, B, thereby determining the axial position of the manual valve 60.

In this embodiment, the electric motor 30 is a switched reluctance motor (SR motor), which has a brushless structure not including a permanent magnet. The electric motor 30 has coils 322 (FIG. 3) each assigned to a U-phase, a V-phase, and a-W phase. The ECU 80 energizes and de-energizes a transistor to control electricity supplied to the coils of the electric motor 30. The ECU 80 sequentially switches electricity supplied to each of the coils 322 of U, V, W-phases, thereby rotating the electric motor 30.

The actuator 20 includes an encoder 25 (FIG. 3) as a sensor. The ECU 80 controls rotation of the electric motor 30 with reference to a count value, which is indicated by a signal outputted from the encoder 25 corresponding to an angular position of the electric motor 30, until the count value becomes a target count valve. Thus, the ECU 80 controls the detent plate 52 to be in an angular position corresponding to the instruction shift range. When the electric motor 30 rotates to be in a predetermined count-value range including the target count value, the ECU 80 determines the detent plate 52 to be in an angular position corresponding to the instruction shift range, so that the ECU 80 terminates control of the rotation of the electric motor 30.

As the shift range changes from the P range to the R range, N range, and D range, the count value indicated by the signal of the encoder 25 increases or decreases. The count value also decreases or increases as the shift range changes in the opposite order to the above order.

The encoder 25 includes a magnet 251, a hall IC 252, and a substrate 253. The substrate 253 is mounted with the hall IC 252. The hall IC 252 detects magnetism of the magnet 251 fixed to a rotor 31. As the rotor 31 rotates, the hall IC 252 detects the magnetism of the magnet 251, every time the magnet 251 passes a position, in which the magnet 251 is opposed to the hall IC 252, so that the hall IC 252 transmits a signal to the ECU 80.

Referring to FIG. 2, the detent plate 52 is a substantially sector-shaped plate having a substantially arc-shaped outer periphery defining multiple latching grooves 53. A detent spring 62 is a cantilever-blade spring fixed to the automatic transmission control device 12 at one fixed end. The detent spring 62 may be provided in a location other than the automatic transmission control device 12. The detent spring 62 may be provided in, for example, the automatic transmission device 100. The detent spring 62 has the other end provided with a roller 63. The roller 63 is applied with resilience of the detent spring 62, and adapted to being latched to one of the latching grooves 53 of the detent plate 52.

The detent plate 52 has a pin 54 latched to the manual valve 60. As the detent plate 52 rotates together with the control rod 50, the manual valve 60 latched to the pin 54 axially moves in accordance with the angular position of the detent plate 52. Each of the latching grooves 53 and the roller 63 are correlated to a predetermined position of the manual valve 60 correspondingly to each shift range. In this structure, when the roller 63 is properly hooked to one of the latching grooves 53, the manual valve 60 is set at a shift range position corresponding to the one of the latching grooves 53.

The electric motor 30 rotates, and the manual valve 60 moves to a shift range position corresponding to an instructed shift position selected using the shift lever. Thus, the automatic transmission control device 12 controls the shift range of the automatic transmission device 100 to be in an actual shift range corresponding to the axial position of the manual valve 60.

The parking lock device 70 stops rotation of an unillustrated output shaft of the automatic transmission device 100 by latching a claw 73 of a parking lock pawl 72 to a recess 71a of the outer periphery of a parking gear 71. A park rod 74 has one end fixed to the detent plate 52. The park rod 74 has the other end latched to a substantially conical shaped cam 76. The cam 76 is engaged with the park rod 74 in a condition where a spring 78 biases the cam 76 toward the other end of the park rod 74. The cam 76 is axially movable along the park rod 74.

As the detent plate 52 rotates, the park rod 74 axially moves, so that the cam 76 upwardly and downwardly actuates the parking lock pawl 72. In this operation, the cam 76 latches the claw 73 of the parking lock pawl 72 to the recess 71a of the parking gear 71, and detaches the claw 73 from the recess 71a. When the claw 73 of the parking lock pawl 72 is latched to the parking gear 71, the automatic transmission device 100 is in a locked condition where rotation of the output shaft of the automatic transmission device 100 is mechanically prohibited. When the claw 73 is detached from the parking gear 71, the automatic transmission device 100 is in an unlocked condition where rotation of the output shaft of the automatic transmission device 100 is permitted.

In a normal operation of the shift-by-wire system 10, driving force of the electric motor 30 is transmitted to the park rod 74 of the parking lock device 70 and the manual valve 60 via the motor output shaft 46, the control rod 50, and the detent plate 52. In this operation, the parking lock device 70 is actuated in conjunction with the manual valve 60. Specifically, when the manual valve 60 moves to a P-range position, the parking lock device 70 is in the locked condition correspondingly to the position of the manual valve 60. When the manual valve 60 moves to a range position other than the P-range position, the parking lock device 70 is in the unlocked condition correspondingly to the position of the manual valve 60.

Next, the actuator 20 as a shift range switching device for shift-by-wire system is described in detail with reference to FIGS. 1, 3.

The actuator 20 includes the electric motor 30 and the reduction device 40 accommodated in a rear housing 21a and a front housing 21b. Both the housings 21a and 21b are clamped with each other using bolts 21c. The housings 21a and 21b respectively have joint planes therebetween interpose a gasket 21d. In the following description, the right side in FIG. 3 is defined as a front side, and the left side in FIG. 3 is defined as a rear side.

First, the configuration of the electric motor 30 is described.

The electric motor 30 includes the rotor 31 and a stator 32. The rotor 31 is rotatably supported. The stator 32 is coaxial with the rotational axis φ1 of the rotor 31. The rotor 31 includes a rotor shaft 311 and a rotor core 312. The rotor shaft 311 is rotatably supported by a first bearing 22a and a second bearing 22b, which are respectively arranged at the front end of this rotor shaft 311 and the rear end of this rotor shaft 311.

The first bearing 22a is arranged on the inner periphery of a drive gear 41, which constructs the reduction device 40. The drive gear 41 is rotatably supported by a third bearing 23, which is arranged on the inner periphery of the front housing 21b. That is, the front end of the rotor shaft 311 is rotatably supported via the third bearing 23, the drive gear 41, and the first bearing 22a, which are provided on the front housing 21b. The second bearing 22b is supported by the rear housing 21a.

The stator 32 includes a stator core 321 and the coils 322. The stator core 321 is provided with stator teeth (not shown), which are provided at intervals of 30 degrees, for example. The stator teeth protrude toward the rotor 31. The coils 322 are wound around the respective stator teeth to respectively define a U-phase, a V-phase, and a W-phase.

The rotor core 312 is provided with salient poles (not shown), which are provided at intervals of 45 degrees, of example. The salient poles protrude toward the stator 32. When energizations for the coils 322 are switched in the order of the W-phase, the V-phase, and the U-phase, the rotor 31 is rotated forward. Alternatively, when energizations for the coils 322 are switched in the order of the V-phase, the W-phase, the U-phase, the rotor 31 is reversed. Here, each time the energizations of the U, V, and W-phases make a round, the rotor 31 is rotated 45 degrees. The energizations for the coils 322 of the U, V, and W-phases are ON/OFF-controlled using the ECU 80.

Next, the construction of the reduction device 40 is described.

The reduction device 40 includes the rotor shaft 311, an external gear 44, an internal gear 45, the drive gear 41, and a driven gear 42. The rotor shaft 311 is common to the rotor shaft of the electric motor 30. The external gear 44 is rotatable eccentrically to the rotor shaft 311 via an eccentric portion 43 provided on the rotor shaft 311. The external gear 44 meshes with the inner periphery of the internal gear 45. The drive gear 41 is coupled with the external gear 44 via a pin 44a. The pin 44a serves as a transmission unit for transmitting a component of rotation of the external gear 44 around the axis of the external gear 44 to the drive gear 41. The driven gear 42 meshes with the drive gear 41.

The eccentric portion 43 is an axis that rotates eccentrically with respect to the rotation center of the rotor shaft 311, thereby rotating the external gear 44 along an orbital path. The eccentric portion 43 rotatably supports the external gear 44 via, for example, two of fourth bearings 24, which are provided to the circumferential outer periphery of the eccentric portion 43.

The external gear 44 is supported so as to be rotatable relative to the eccentric portion 43 of the rotor shaft 311 via the fourth bearings 24. This external gear 44 is rotated in conjunction with the eccentric portion 43 in a state where the external gear 44 is pressed against the internal gear 45. The internal gear 45 is fixed to the front housing 21b.

In this structure, the rotor shaft 311 is driven to eccentrically rotate the external gear 44, whereby the external gear 44 is rotated at a reduced speed relative to the rotor shaft 311, and the reduced-speed rotation is transmitted to the drive gear 41. Further, the rotation speed is further reduced in transmission from the drive gear 41 to the driven gear 42. The output shaft 46 is fixed to the driven gear 42 and connected to the control rod 50 of the shift-by-wire system 10 (FIG. 2). Thus, the rotational torque of the electric motor 30 is reduced in speed via the external gear 44, the internal gear 45, the drive gear 41 and driven gear 42, and the torque reduced in speed is transmitted to the control rod 50.

Next, the configurations of the drive gear 41 and the driven gear 42 are described.

The drive gear 41 and the driven gear 42 are so configured that the gear ratio between both the gears 41 and 42 changes with rotations. That is, the reduction device 40 has a variable reduction ratio.

Figure 1:
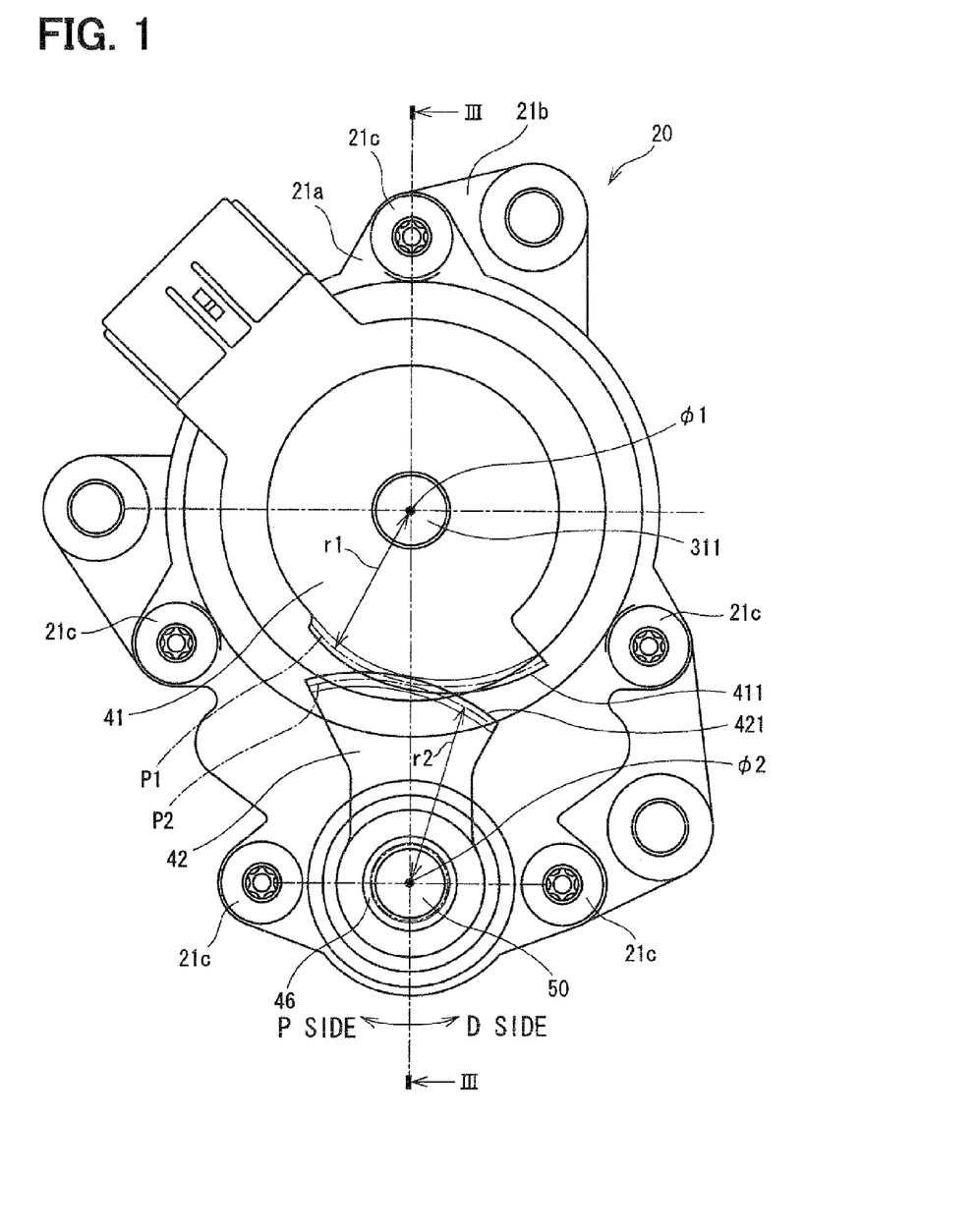
FIG. 1 is a schematic view showing an inner mechanism of an actuator of a shift-by-wire system.

Specifically, as shown in FIG. 1, the drive gear 41 and the driven gear 42 respectively have tooth portions 411 and 421 meshing with each other. Both the gears 41 and 42 respectively have circumferences respectively partially define the tooth portions 411 and 421 in shapes of circular arcs. The drive gear 41 is rotatable in a range of 180°, for example.

Both the tooth portions 411 and 421 respectively have pitch circles P1 and P2 being in elliptical shapes. Specifically, the tooth portion 411 has a pitch radius r1 from the rotational axis φ1 of the drive gear 41 to the pitch point or the tooth top of the tooth portion 411. The pitch radius r1 gradually changes. Likewise, the tooth portion 421 has a pitch radius r2 from the rotational axis φ2 of the driven gear 42 to the pitch point or tooth top of the tooth portion 421. The pitch radius r2 also gradually changes.

When the driven gear 42 is rotated in a clockwise direction in FIG. 1 such that the control rod 50 is turned toward the P-range, the pitch radius r2 of the driven gear 42 gradually becomes large, and the pitch radius r1 of the drive gear 41 gradually becomes small. Therefore, the reduction ratio gradually becomes large, so that the output shaft 46 is rotated at a large torque and a low speed.

Figure 4A:
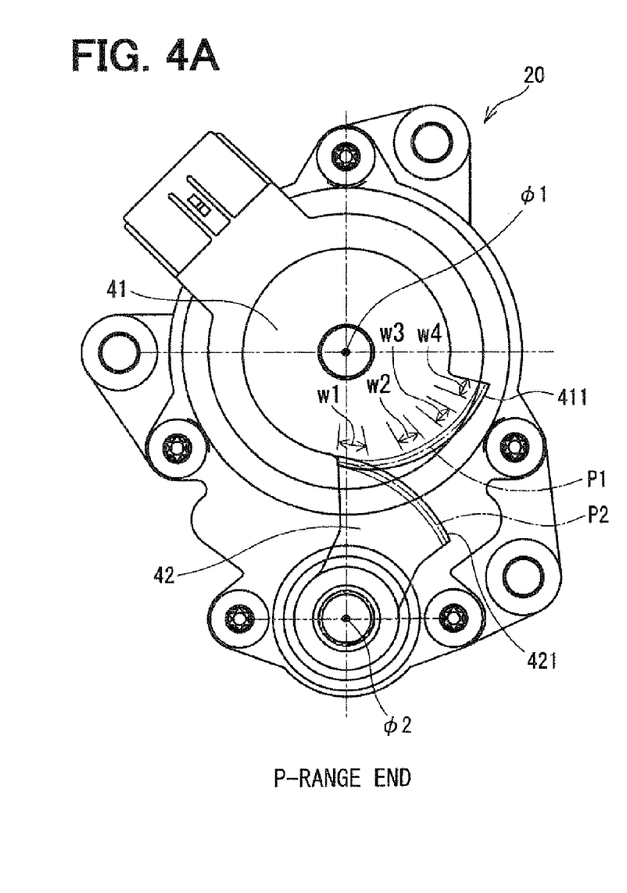
FIGS. 4A, 4B are schematic views each showing an operation of the actuator.

Incidentally, FIG. 4A shows a state where the driven gear 42 is rotated, and is in the turning end on the side of the P-range. The reduction ratio becomes the maximum in the turning end on the side of the P-range.

When the driven gear 42 is rotated in an anticlockwise direction in FIG. 1 such that the control rod 50 is turned toward the D-range, the pitch radius r2 of the driven gear 42 gradually becomes small, and the pitch radius r1 of the drive gear 41 gradually becomes large. Therefore, the reduction ratio gradually becomes small, so that the output shaft 46 is rotated at a small torque and a high speed.

Figure 4B:
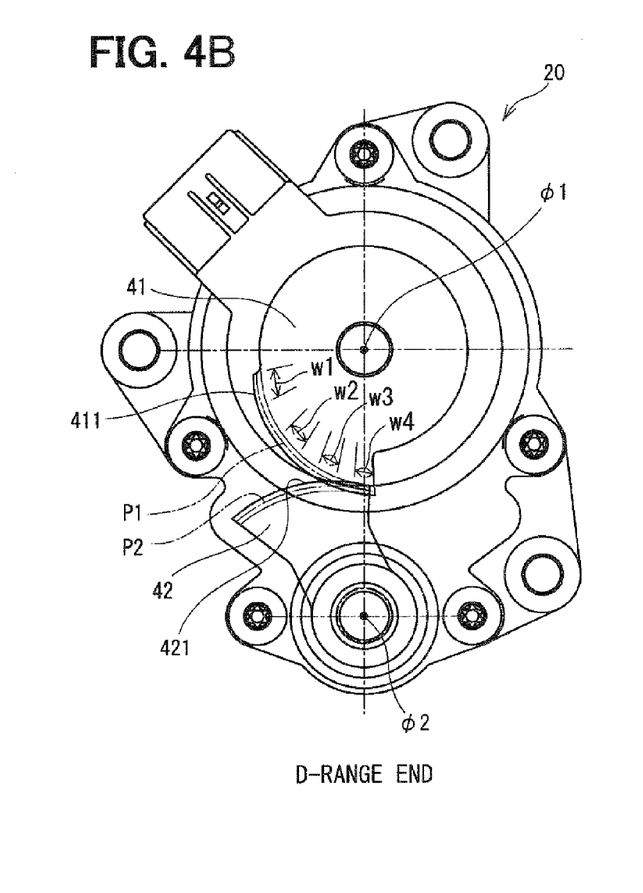

Incidentally, FIG. 4B shows a state where the driven gear 42 is rotated, and is in the turning end on the side of the D-range. The reduction ratio becomes the minimum in the turning end on the side of the D-range.

In this embodiment, the reduction ratio between the drive gear 41 and the driven gear 42 is variable in a range between 1 and 1.7, for example.

Reference numerals W1, W2, W3 and W4 in FIGS. 4A and 4B respectively indicate the ranges of the tooth portion 411 of the drive gear 41. In a state where the range W1 of the tooth portion 411 is in mesh with the tooth portion 421 of the driven gear 42, the manual valve 60 is moved to the position of the P range. Likewise, in states where the ranges W2, W3 and W4 of the tooth portion 411 are in mesh with the driven gear 42, the manual valve 60 is correspondingly moved to the positions of the R range, the N range, and the D range.

Here, when the movable positions of the manual valve 60 are arrayed in the order of the P range, the R range, the N range, and the D range, the switchings of the shift ranges have the following patterns (1) to (6):

(1) P range to R range;
(2) R range to P range;
(3) R range to N range;
(4) N range to R range;
(5) N range to D range; and
(6) D range to N range.

The reduction ratio of the reduction device 40 becomes small in the order of the ranges W1, W2, W3 and W4, and hence, the reduction ratio becomes small in the order of (1) to (6) in the switchings based on the patterns.

The actuator 20 serves as the shift range switching device for the shift-by-wire system. As described above, in the actuator 20, the torque required for actuating the manual valve 60 becomes the maximum in the pattern (1) defining the switching from the P range to the R range. In this switching from the P range to the R range, the reduction ratio becomes greater than the other reduction ratios in the switchings of the patterns (2) to (6). Therefore, the output shaft 46 can be rotated at the maximum torque, so that the P range can be reliably switched to the R range.

Alternatively, the reduction ratios become small in the switchings respectively defined by the other patterns (2) to (6). In this structure, the output shaft 46 can be rotated at high speed, so that the manual valve 60 can be enhanced in switching response.

Here, the torque, which is required for actuating the manual valve 60 in the switching of the shift range from the R range to the P range as defined by the pattern (2), becomes greater than the torques, which are required in the switchings of the shift range between the other ranges defined by the patterns (3) to (6). In this embodiment, the reduction ratio in the switching of the shift range from the R range to the P range as defined by the pattern (2) is less than the reduction ratio in the switching from the P range to the R range, as defined by the pattern (1). The reduction ratio in the switching as defined by the pattern (2) is greater than the reduction ratios in the switchings between the other ranges defined by the patterns (3) to (6).

In this structure, the reduction ratio in the switching from the R range to the P range as defined by the pattern (2) is greater than the reduction ratio in the switchings between the other ranges defined by the patterns (3) to (6).

Therefore, in the pattern (2), the output shaft 46 can be rotated at a greater torque than in the patterns (3) to (6), so that the R range can be reliably switched to the P range. Moreover, in the pattern (2), the output shaft 46 can be rotated at a higher speed than in the pattern (1), so that the manual valve 60 can be enhanced in switching response.

Since the shift-by-wire system 10 includes the parking lock device 70, the required torque becomes the maximum in the pattern (1) among the switching patterns (1) to (6). More specifically, when the shift range is switched from the P range to the R range, as defined by the pattern (1), the cam 76 needs to be pulled out of the parking lock pawl 72 against the frictional force between the parking lock pawl 72 and the cam 76. In particular, when the shift range is switched from the P range to the R range in a condition where the vehicle is parked on a sloping road, the weight of the vehicle applies a rotating force to the parking gear 71. Therefore, the rotating force is transmitted from the recess 71a of the parking gear 71 to the claw 73 of the parking lock pawl 72. Consequently, the parking lock pawl 72 is strongly pressed against the cam 76, so that the frictional force between the parking lock pawl 72 and the cam 76 becomes large. For the above reason, the required torque becomes the maximum in the pattern (1).

Besides, the required torque in the pattern (2) becomes greater than the required torques in the patterns (3) to (6), for the following reason. In the switching from the R range to the P range, as defined by the pattern (2), the claw 73 may not be completely engaged with the recess 71a in a condition where the claw 73 and the recess 71a are not synchronized. In this condition, the park rod 74 needs to be moved toward the cam 76 against the resiliency of the spring 78. Therefore, the required torque in the pattern (2) becomes greater than the required torques in the patterns (3) to (6) in correspondence with the force for resiliently deforming the spring 78. When the claw 73 and the recess 71a are synchronized, the frictional force between the parking lock pawl 72 and the cam 76 may become less than the force for resiliently deforming the spring 78. However, even in this condition, the required torque in the pattern (2) becomes greater than the required torques in the patterns (3) to (6) in correspondence with the frictional force between the parking lock pawl 72 and the cam 76.

Modification

As a modification to the embodiment, the ECU 80 may perform the following control for calculating the absolute rotational position of the rotor 31 of the SR motor (electric motor) 30 in the actuation of the SR motor 30. The ECU 80 is capable of calculating the rotational position of the rotor 31 relative to the stator 32 in accordance with the detection signal of the encoder 25. However, the ECU 80 cannot calculate the rotational position of the detent plate 52 and the absolute rotational position of the rotor 31 with respect to the position of the manual valve 60, only with the detection signal of the encoder 25. Accordingly, in this case, the ECU 80 cannot control the position of the manual valve 60 at a desired position. The ECU 80 may execute the following control to calculate the absolute rotational position of the rotor 31.

In the ensuing description, one of the engagement grooves 53 at the turning end on the side of the P-range, when the detent plate 52 is rotated along the arrow B in FIG. 2, is defined to be a P-range engagement groove 531. In addition, one of the engagement grooves 53 at the turning end on the side of the D-range, when the detent plate 52 is rotated along the arrow A in FIG. 2, is defined to be a D-range engagement groove 532. When the shift range is switched to the P range, the roller 63 is engaged with the P-range engagement groove 531. When the shift range is switched to the D range, the roller 63 is engaged with the D-range engagement groove 532. The D-range engagement groove 532 serves as another range engagement groove. The roller 63 serves as an engagement member.

For example, immediately after an ignition switch is turned ON, the ECU 80 further turns the detent plate 52 toward the P-range in a state where the roller 63 is engaged with the P-range engagement groove 531. In this condition, the roller 63 is pressed against a wall surface 531a of the P-range engagement groove 531 on the side of the P-range. In this condition, the ECU 80 detects the rotational position of the rotor 31 as an initial rotational position. The ECU 80 prestores the initial rotational position to correspond to the position at which the roller 63 is pressed against the wall surface 531a. In this operation, the ECU 80 is capable of calculating the rotational position of the detent plate 52 and the absolute rotational position of the rotor 31 with respect to the position of the manual valve 60.

The ECU 80 serves as an initial position calculation unit when calculating the absolute rotational position.

The ECU 80 turns the detent plate 52 toward the D-range after pressing the roller 63 against the wall surface 531a on the side of the P-range, in order to enhance the accuracy of the calculation of the absolute rotational position. Specifically, the ECU 80 turns the detent plate 52 toward the D-range, and the roller 63 is engaged with the D-range engagement groove 532. In this condition, the ECU 80 further turns the detent plate 52 toward the D-range in the state where the roller 63 is engaged with the D-range engagement groove 532. In this condition, the roller 63 is pressed against a wall surface 532a of the D-range engagement groove 532 on the side of the D-range. In this condition, the rotational position of the rotor 31 is detected as an initial rotational position. With the initial rotational position, the ECU 80 calculates the rotational position of the detent plate 52 and the absolute rotational position of the rotor 31 with respect to the actuation position of the manual valve 60.

In this operation, the rotational positions of the rotor 31 are detected as the initial rotational positions at both the positions of the wall surface 531a on the side of the P-range and the wall surface 532a on the side of the D-range. Thus, the accuracy of the calculation of the absolute rotational position can be enhanced.

The ECU 80 regularly calculates the rotational position of the rotor 31 on the basis of the absolute rotational position of the rotor 31 calculated as stated above and the detection signal from the encoder 25.

The ECU 80 serves as a rotational position calculation unit when calculating of the rotational position. The encoder 25 serves as a sensor.

In this modification, the initial rotational position of the rotor 31 needs to be calculated by pressing the roller 63 against the wall surface 532a on the side of the D-range for determining the rotational position of the rotor 31. In the above structure of the embodiment, the reduction ratio becomes the minimum in the switching of the shift range from the N range to the D range, as defined by the pattern (5). Therefore, the force pressing the roller 63 against the wall surface 532a on the side of the D-range can be restricted from being excessively large. Thus, the mechanical strength of the wall surface 532a on the side of the D-range in the detent plate 52 can be reduced.

In this modification of the shift-by-wire system, the roller 63 may be pressed against the wall surface 531a on the side of the P-range each time the ignition switch is turned ON. Further, the roller 63 may be pressed against the wall surface 532a on the side of the D-range, each time a battery is replaced or each time the number of tuning ON of the ignition switch becomes a predetermined number between 1000 and 5000, for example. In particular, in the above operation, the loads applied to the actuator 20, the parking lock device 70, the automatic transmission control device 12, and the like can be reduced when the roller 63 is biased against the D-range wall surface 532a.

In addition, it is possible to reduce the mechanical strengths of the joint between the control rod 50 and the detent plate 52, the bearing of the control rod 50, the reduction device 40 of the actuator 20, the respective bearings 22a, 22b, 23, 24, and the like.

Other Embodiments

In the foregoing embodiment, the reduction device 40 having the variable reduction ratio is configured with the tooth portions 411 and 421 of the drive gear 41 and the driven gear 42 respectively having the pitch circles P1 and P2 in the elliptical shapes. However, the configuration of the reduction device 40 is not limited to the tooth portions 411 and 421 having the respective pitch circles P1 and P2 respectively in the elliptical shapes.

In addition, in the foregoing embodiment, the electric motor 30 is the SR motor, nevertheless, the electric motor 30 is not limited to the SR motor.

In the foregoing embodiment, the actuation of biasing the roller 63 against the wall surface 531a on the side of the P-range is executed with the turning ON of the ignition switch as a trigger.

Alternatively, the actuation of biasing the roller 63 may be executed with the turning ON of an accessory switch as a trigger. The above processings such as calculations and determinations are not limited being executed by the ECU 80. The control unit may have various structures including the ECU 80 shown as an example.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A shift range switching device for a shift-by-wire system for an automatic transmission device, the shift range switching device comprising:

a range switching unit for switching a shift range of the automatic transmission device between a P range and an other range; and an actuator including an electric motor and a reduction device, the reduction device transmitting driving force of the electric motor to the range switching unit for actuating the range switching unit as instructed, wherein the reduction device has a variable reduction ratio, and the reduction device transmits the driving force in switching of the shift range from the P range to the other range at a reduction ratio, which is greater than a reduction ratio in switching of the shift range from the other range to the P range.

2. The shift range switching device as defined in claim 1, wherein the reduction device includes a drive gear and a driven gear, each having a pitch circle being in an elliptical shape having a diameter, which gradually changes.

3. The shift range switching device as defined in claim 1, further comprising:
   a detent plate rotatable in conjunction with the range switching unit toward a position corresponding to the shift range as instructed; and
   an engagement member adapted to engaging with the detent plate,
   wherein the detent plate has one turning end defining a P-range engagement groove on one side,
   when the detent plate is turned to a position of the P-range, the P-range engagement groove is adapted to engaging with the engagement member for regulating turning of the detent plate toward the one side,
   the detent plate has an other turning end defining an other range engagement groove on an other side, and
   when the detent plate is turned to a position of the other range, the other range engagement groove is adapted to engaging with the engagement member for regulating turning of the detent plate toward the other side,
   the shift range switching device, further comprising:
   an initial position calculation unit for calculating an initial rotational position of a rotor of the electric motor by further turning the detent plate toward the other side to bias the engagement member against the other range engagement groove in a state where the engagement member is engaged with the other range engagement groove;
   a sensor for detecting a relative rotational position of the rotor relative to a stator of the electric motor; and
   a rotational position calculation unit for calculating an absolute rotational position of the rotor on the basis of the calculated initial rotational position and the detected relative rotational position.

4. The shift range switching device as defined in claim 1, wherein the other range includes an R range, an N range, and a D range,
   the range switching unit is operable from the P range to the R range, the N range, and the D range in order,
   the range switching unit switches the shift range from the R range to the P range at a first reduction ratio,
   the range switching unit switches the shift range from the P range to the R range at a second reduction ratio,
   the range switching unit switches the shift range between other ranges at a third reduction ratio,
   the first reduction ratio is less than the second reduction ratio, and
   the first reduction ratio is greater than the third reduction ratio.

5. The shift range switching device as defined in claim 1, comprising:
   a parking lock device,
   wherein the parking lock device brings an output shaft of the automatic transmission device into a locked condition in conjunction with the switching of the range switching unit to the P range, and
   the parking lock device brings the output shaft into an unlocked condition in conjunction with the switching of the range switching unit into the other range.

6. A method for switching a shift range of an automatic transmission device via a shift-by-wire system, the method comprising:
   transmitting driving force of an electric motor to a range switching unit via a reduction device at a first reduction ratio in switching of the shift range from a P range to an other range; and
   transmitting the driving force of the electric motor to the range switching unit via the reduction device at a second reduction ratio in switching of the shift range from the other rang to the P range,
   wherein the first reduction ratio is greater the second reduction ratio.

7. The method as defined in claim 6,
   wherein each of the transmittings includes:
   transmitting the driving force of the electric motor to the range switching unit by engaging a drive gear and a driven gear each having a pitch circle being in an elliptical shape.

8. The method as defined in claim 6, further comprising:
   turning a detent plate to a position of the P-range so as to engage an engagement member with a P-range engagement groove at one turning end of the detent plate for regulating turning of the detent plate toward one side;
   calculating a parking initial rotational position of a rotor of the electric motor by further turning the detent plate toward the one side to bias the engagement member against the P-range engagement groove;
   detecting a relative rotational position of the rotor relative to a stator of the electric motor; and
   calculating an absolute rotational position of the rotor on the basis of the calculated parking initial rotational position and the detected relative rotational position.

9. The method as defined in claim 8, further comprising:
   turning the detent plate to a position of the other range so as to engage the engagement member with an other engagement groove at an other turning end of the detent plate for regulating turning of the detent plate toward an other side; and
   calculating an other initial rotational position of the rotor of the electric motor by further turning the detent plate toward the other side to bias the engagement member against the other range engagement groove,
   wherein the calculating of the absolute rotational position includes:
   calculating the absolute rotational position of the rotor on the basis of the calculated parking initial rotational position, the calculated other initial rotational position, and the detected relative rotational position.

* * * * *